United States Patent [19]

Schlunt et al.

[11] Patent Number: 4,620,293

[45] Date of Patent: Oct. 28, 1986

[54] OPTICAL MATRIX MULTIPLIER

[75] Inventors: Richard S. Schlunt, Loma Linda; Hans-Peter Schmid, Rancho Cucamonga; Donald R. Fetterly, Norco, all of Calif.

[73] Assignee: General Dynamics, Pomona Division, Pomona, Calif.

[21] Appl. No.: 565,062

[22] Filed: Dec. 23, 1983

[51] Int. Cl.[4] .......... G06G 9/00; G06F 7/56

[52] U.S. Cl. .......... 364/845; 364/713

[58] Field of Search .......... 364/845, 822, 713, 754

[56] References Cited

U.S. PATENT DOCUMENTS

| | | | |
|---|---|---|---|
| 2,702,158 | 2/1955 | Winter | 364/845 |
| 2,712,415 | 7/1955 | Piety | 364/845 |
| 2,740,583 | 4/1956 | Holden | 364/845 |
| 3,042,912 | 7/1962 | Gilbert | 340/347 |
| 3,068,361 | 12/1962 | Lannan | 364/845 |
| 3,305,669 | 2/1967 | Fan | 364/845 |
| 3,588,486 | 6/1971 | Rosen | 364/845 |
| 3,680,080 | 7/1972 | Maure | 364/713 |
| 3,937,942 | 2/1976 | Bromley et al. | 364/822 |
| 4,009,380 | 2/1977 | Bocker et al. | 364/713 |
| 4,084,880 | 4/1978 | Clow | 364/713 |
| 4,286,328 | 8/1981 | Bocker | 364/822 |
| 4,351,589 | 9/1982 | Chavel et al. | 364/713 |
| 4,386,414 | 5/1983 | Case | 364/713 |

FOREIGN PATENT DOCUMENTS

| | | | |
|---|---|---|---|
| 1246536 | 10/1960 | France | 364/713 |
| 660065 | 4/1979 | U.S.S.R. | 364/845 |
| 690509 | 8/1979 | U.S.S.R. | 364/845 |

OTHER PUBLICATIONS

G. Fan, "Optical Matrix Inverter", IBM Technical Disclosure Bulletin, vol. 6, No. 1, Jun. 1963, p. 131.

*Primary Examiner*—David H. Malzahn

*Attorney, Agent, or Firm*—Neil F. Martin; Terrance A. Meador; Edward B. Johnson

[57] ABSTRACT

An optical computing system is provided for performing a linear multiplication operation involving a matrix with bipolar values. A plurality of beams representing the values of a N×1 column matrix Q illuminate an optical mask having elements disposed in a two-dimensional (M+1)×N array. Each element of the first M rows of the mask represents the offset of the value of a corresponding element in a known M×N matrix by a scalar constant c. Each element of row M+1 of the mask represents the value c. An array of photodetectors collects the light passing through the mask, with the light from each row of elements detected by a respective photodetector. The outputs of the first M photodetectors represent the product of Q and M after M has been offset by c. The output of photodetector M+1 represents the scalar value produced by the multiplication of Q and a row matrix represented by row M+1 of the mask matrix. This scalar value can be used to adjust the outputs of the first M photodetectors, the result being equivalent to Q·M.

8 Claims, 5 Drawing Figures

OPTICAL MATRIX MULTIPLIER

BACKGROUND OF THE INVENTION

The present invention relates to optical systems capable of performing linear mathematical functions. More particularly, the invention relates to improvements in the form of an optical mask which is used in such systems to represent a known two-dimensional matrix having both positive and negative elements. The apparatus of the invention is specifically designed to permit the multiplication of a bipolar matrix which is represented by a single optical mask.

Characteristically, optical computing systems operate by directing one or more beams of light through an optical material of variable transmittance. The intensity of a light beam is adjusted to represent a predetermined value, while the transmittance of the material is altered to indicate another predetermined value. A solution for an equation containing the two predetermined values is obtained by observing the intensity of the beam after it passes through the optical material.

Conventionally, the optically transmissive material is in the form of a mask having selectively variable optical characteristics which enable one to program or select varying values of transmittance. Further, it is known to divide the area of such a mask into a number of zones of independently selectable transmittance so that the mask can represent a plurality of separate values, with the transmittance of each zone representing a respective value. Examples of such systems for optically performing mathematical computations are shown in the following U.S. Pat. Nos.: 4,286,382; 3,042,912; 3,068,361; and 3,937,942.

As is known, an optical computing system can efficiently perform matrix operations when the mask is subdivided into a plurality of separate zones as described above, and the zones are arranged in rows and columns to form a two-dimensional matrix. Characteristically, one or more such masks are disposed to intercept a number of light beams. In operation, the light beams can represent a matrix of values, with each beam indicating a respective value of the matrix. After passage through the mask or masks, the beams are separately detected by one or more photodetectors and converted thereby into electrical signals representative of the product of two or more matrices. Examples of optical computing systems employing optically-encoded masks to perform matrix multiplication are found in U.S. Pat. No. 3,305,669; U.S. Pat. No. 3,588,486; U.S. Pat. No. 4,009,380; and in an article entitled "Optical Matrix Inverter," by G. Fan, which appeared in *IBM Technical Disclosure Bulletin,* Vol. VI, No. 1, June 1963. In addition, U.S. Pat. No. 4,386,414 discloses the use of a mask consisting of a holographic optical element which is subdivided into an $M \times N$ element matrix.

An important limitation of the optical matrix multiplication systems described or disclosed in the cited references is their inability to operate with bipolar values. As is known, light, unlike electricity, can be expressed only in unipolar quantities. Hence, without some provision in the optical system for representing and manipulating negative values, the disclosed matrix multipliers are limited to use with only unipolar values.

Two examples of optical computing systems which do provide for the manipulation of bipolar values are U.S. Pat. No. 2,702,158 and U.S. Pat. No. 2,712,415. In the first example, mathematical functions are performed by providing electrical signals representative of selected values to respective sweep circuits of a conventional cathode ray tube. The sweep circuits are configured to perform a predetermined mathematical function with values represented by the applied signals, and the screen of the tube is divided into four quadrants into which the tube's beam can be deflected. Each quadrant is representative of the sign of the solution of the function with voltages of selected magnitude and polarity applied to the CRT's sweep circuits. In U.S. Pat. No. 2,712,415, an optical computer is adapted to manipulate two functions irrespective of their signs by the provision of separate areas on one or more coded optical masks. Each area is representative of the positive or negative portion of a respective function, and the system transmits one beam of light through all positive portions of all functions and a separate beam through the negative portions of all functions. The beams are detected and combined to provide the algebraic product of the functions. Neither of these examples provide a suitable means for operating in combination with an encoded mask upon which representation of bipolar values have been randomly distributed.

The following references are of general interest to the field of optical computing: U.S. Pat. No. 2,740,583; U.S.S.R. Disclosure No. 690,509; U.S.S.R. Disclosure No. 660,065; and French Patent No. 1,246,536.

SUMMARY OF THE PRESENT INVENTION

The present invention provides an improvement over existing optical matrix multiplication systems by utilizing an optically transmissive mask having a plurality of individual elements which are disposed in rows and columns to form a two-dimensional matrix having $M+1$ rows. Each element of the first M rows of the mask matrix is representative of the combination of a predetermined value in a known matrix, M, having M rows, and a scalar constant, c. Each element of row $M+1$ of the mask matrix is representative of the scalar constant c which has been added to each element of the known matrix M. This affords the selection of a scalar constant value which will, when combined with the elements of matrix M, permit those elements to be uniformly offset such that the matrix M will have unipolar entries. Thus, the elements of the mask matrix can be illuminated according to known methods without regard to their original polarities. In addition, the entry of the value of the constant for each element of row $M+1$ of the mask matrix preserves a record of the constant.

Subsequent mathematical manipulation of the matrix can be carried out and the resultant matrix adjusted by subtraction of a scalar value which is generated using row $M+1$ of the mask matrix.

The concept of the present invention contemplates a light source which produces a plurality of light beams, with the intensity of each beam representative of a predetermined value in a known column vector, Q. The beams illuminate the optically transmissive mask, and the individual elements of the mask permit light to pass through. The intensity of the light transmitted by an element is a function of the intensity of the illuminating beam and the transmittance of the element. The intensity of the light transmitted through the matrix represents the multiplication of Q and M after M has been offset by c, and of Q and row $M+1$.

A photodetector array is positioned to receive light transmitted through the mask to determine the intensity of the light received at its position and to provide a signal representative of a matrix multiplication operation comprising the vector Q and the offset matrix M and another signal representative of another matrix multiplication of the vector Q and row M+1 of the mask matrix.

Because the present invention provides a system wherein a known matrix M comprising bipolar values may be represented by an optical mask matrix having elements corresponding to the elements of the matrix M which have been offset by a scalar quantity c to unipolar values, the system in effect can perform functions on the matrix M involving bipolar elements without having to provide a means for distinguishing values of different polarity.

Accordingly, it is a primary object of the present invention to provide an improved optical system for performing mathematical functions on matrices which include bipolar values.

Yet another object of the present invention is to provide, for an optical matrix multiplication system, an optical mask which represents a known matrix having bipolar values.

These and other objects and advantages of the present invention will become more readily apparent from the ensuing specification when taken together with the drawings.

DESCRIPTION OF THE PREFERRED EMBODIMENT

If M is a known matrix having M rows, $R_1$–$R_M$, and N columns, $C_1$–$C_N$, and Q is a N×1 column vector, then the matrix product of Q and M is given by $[Q\cdot R_1, Q\cdot R_2, \ldots QR_M]^T$, where "·" denotes the well-known dot product of two vectors, and $R^M$ is the Mth row of the matrix M.

Should M have bipolar entries, that is, elements having either positive or negative values, the dot product operation is a straight forward one involving the algebraic combination of quantities. As is known, optical computation systems are available which are capable of performing the matrix product operation. Such systems are taught, for example, in U.S. Pat. No. 3,305,669 and U.S. Pat. No. 4,009,380 both of which are incorporated herein by reference. However, such systems are unable to perform matrix multiplication on matrices including bipolar values because light, unlike electricity, is unipolar.

However, a scalar constant, c, of sufficient magnitude can be added to each element of the matrix M (denoted as M+c) so that M+c has non-negative entries. The matrix M+c can then be manipulated by, for example, multiplication with the matrix Q. The matrix product of Q and M+c, denoted as Q·(M+c), can then be converted to the product of Q and M by the subtraction of the scalar $Q\cdot C_{constant}$ from each element of Q·(M+c), where $C_{constant}$ is a 1×N vector, all of whose elements are equal to c. This is expressed by the following equation:

$$Q\cdot M = Q\cdot(M+c) - Q\cdot C_{constant} \quad (1)$$

The relationship of equation (1) forms the basis of the system of the invention.

Figure 1:
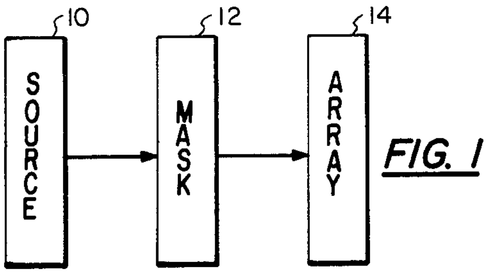
FIG. 1 illustrates the general arrangement of parts of the system of the invention.

FIG. 1 is a schematic block diagram of the system of the present invention showing the arrangements of its parts. This system includes a source of light energy 10 (source) which is positioned to illuminate an optical mask 12 (mask). A photodetector array 14 (array) receives the light transmitted through the optical mask 12 and provides a signal indicative of the intensity of the light transmitted through the mask 12.

Figure 2:
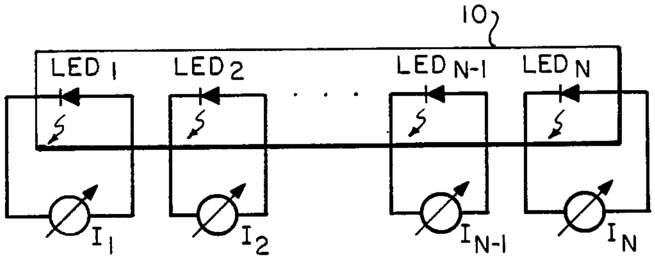
FIG. 2 illustrates the arrangement of photoemitters which are used to produce light beams for illuminating the mask of the system of the invention.

The optical source 10 which is illustrated in greater detail in FIG. 2, comprises a linear array of N photoemitters, each of which provides an output beam of light whose intensity represents the value of a respective element, $q_n$, of the column vector Q. Preferably, each photoemitter comprises a device which permits the intensity of its output beam to be selectively modulated so that the beam can represent a selected one of a continuous range of values. The photoemitters preferably comprise N light-emitting diodes (LED's), $LED_1$–$LED_N$, each connected to a respective one of a group of variable current sources, $I_1$–$I_N$. Each current source can be set to cause its associated LED to produce a light beam, the intensity of which is proportional to the value of the associated element of Q.

Figure 3:
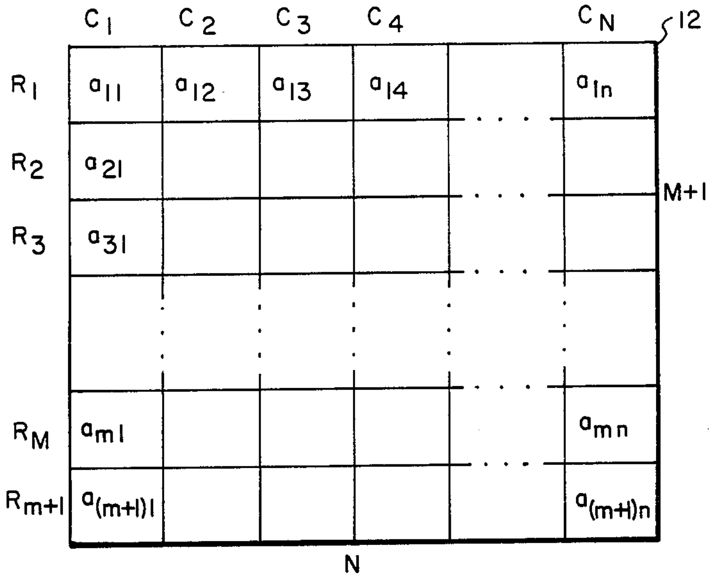
FIG. 3 illustrates the mask of the system of the invention whereupon areas having selectively variable transmittance are disposed in rows and columns to form a two-dimensional matrix.

The mask 12 consists of a light transmissive material or device having a plurality of transmissive elements, a, which are arranged in a two-dimensional matrix having M+1 rows, $R_1$–$R_{M+1}$ and N columns, $C_1$–$C_N$. In FIG. 3, each element is denoted by a subscript, xy, where x identifies the row and y the column in which the element is located. For example, element $a_{13}$ is the element located at the intersection of row $R_1$ and column $C_3$. The mask 12 can comprise, for example, a photographic plate or film on which individual locations corresponding to the elements of the FIG. 3 matrix have been developed to provide different values of light transmittance. Alternatively, the mask 12 can comprise a conventional liquid crystal matrix or any other two-dimensional spatial light modulator.

In the system of the invention, the rows $R_1$–$R_M$ correspond to the matrix M, and each matrix element in rows $R_1$–$R_M$ has information defined by its degree of transmittance which is representative of the sum of the value of a correspondingly-located element of the matrix M and the scalar constant, c. The transmittance of each element of row $R_{M+1}$ defines information representing the value of the scalar constant, c. It should be evident that row $R_{M+1}$ represents the row vector $C_{constant}$, in which each element is equivalent to the scaler constant, c.

Figure 4:
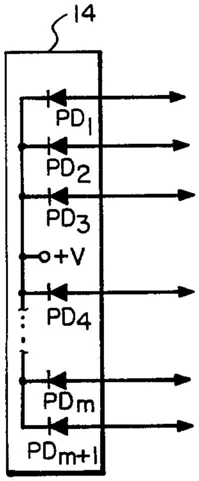
FIG. 4 illustrates the arrangement of photodetectors which are used to receive the light transmitted by the matrix mask of FIG. 3.

As is illustrated in FIG. 4, the photodetector array 14 includes an array of M+1 photodetectors. Preferably, the photodetectors comprise respective photodiodes, $PD_1$–$PD_{M+1}$. Each photodetector is connected to circuitry (not shown) which conventionally provides an electrical signal representative of the amount of light falling on the photodetector.

Figure 5:
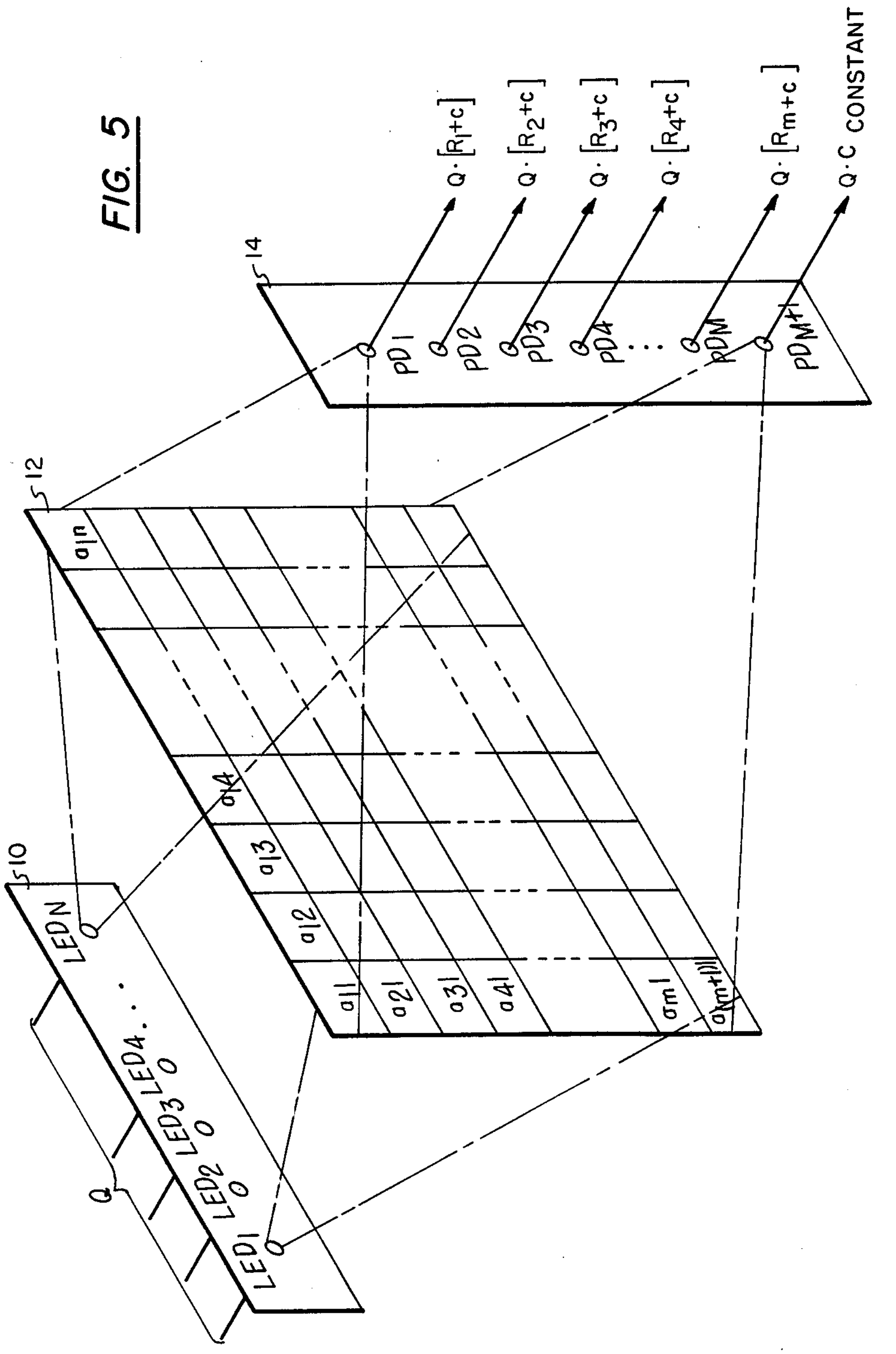
FIG. 5 illustrates, partly in block diagram form, the operation of the system of the invention.

The operation of the system of the invention can be understood with reference to FIG. 5. In operation, each photoemitter of the light source 10 is operated to emit a light beam of an intensity representative of the magnitude of an associated element of the column vector, Q. Thus, the elements $q_1$–$q_N$ are represented by beams emitted by $LED_1$–$LED_N$, respectively. The light beam emitted by an LED is guided to an associated column of elements of the matrix mask 12. Thus, the beam from $LED_1$ illuminates elements, $a_{11}$–$a_{(M+1)1}$ of column $C_1$. Similarly, the beam from $LED_N$ is guided to illuminate the elements of column $C_N$.

The beams from the light source 10 can be guided to their associated matrix columns by any means (not shown) which is well-known in the art. For example, a bundle of optical fibers may be employed to guide the output of an LED to its associated column. Alternatively, an oscillating mirror can be used to sweep the beam of an LED down the column. A converging cylindrical lens may also be used in the manner taught in U.S. Pat. No. 3,305,669 to guide the beams to the mask.

Another corresponding conventional guiding means (not shown) may be likewise employed to collect the light which passes through the optical mask 12 when it is illuminated as described above and guide it to the photodetector array 14. For example, the guiding means can also comprise optical fiber bundles, an oscillating mirror, or a cylindrical lens. In the preferred embodiment, the guiding means operates to collect the light which is transmitted through each respective row of elements in the optical matrix 12 and guide the light from each row to an associated photodetector of the photodetection array, with the light transmitted through rows, $R_1$–$R_{M+1}$, collected respectively by photodiodes, $PD_1$–$PD_{M+1}$.

Operated in this manner, the magnitude of the voltage provided by any one of the photodiodes $PD_1$–$PD_M$ represents the dot product of the column vector Q and an associated row $R_1$–$R_M$ of matrix M biased by the addition of c to each of its elements. The output of $PD_{M+1}$ represents the scalar value resulting from $Q.C_{constant}$. These voltages can be provided to processing circuitry (not shown) which can appropriately encode the voltage values and mathematically manipulate the encoded values according to equation (1). For example, the signal from $PD_{M+1}$ can be inverted and algebraically added to the signals from $PD_1$–$PD_M$ to implement equation (1) by electrically adjusting those signals to values representative of the dot product of Q and M.

The teachings and techniques of the above-described invention for encoding matrix information on an optical mask permit the desired objective of optically performing matrix multiplication on matrices having bipolar values.

Obviously many modifications and variations of the present invention are possible in light of the above teachings. It is therefore to be understood that within the scope of the appended claims, the invention may be practiced otherwise than as specifically described.

What is claimed is:

1. An optical system for performing matrix manipulations, comprising:

a source means for producing a plurality of light beams to illuminate a plurality of locations, the intensity of each beam representative of a predetermined value in an $N\times1$ column vector, Q;

an optically transmissive mask disposed to be illuminated by said source means and including a plurality of elements corresponding to said plurality of locations, said elements disposed in a two-dimensional mask matrix having M+1 rows and N columns, wherein each said element has information defined by its degree of optical transmittance, and each element in each row of M rows of said mask matrix is representative of the sum of a predetermined value in a known $M\times N$ matrix and a scalar constant, c, and each element of the remaining row of said mask matrix is representative of said scalar constant, c; and photodetection means positioned to receive light transmitted through said mask for determining the intensity of light received at its position, and for providing one or more first signals representative of a function of said vector Q and said known matrix and a second signal representative of a function of said vector Q and said scalar constant, c.

2. The system of claim 1 wherein said photodetection means comprises M+1 photodetectors, each positioned to receive light transmitted from a respective row of said mask matrix.

3. The system of claim 1 wherein said source means comprises N photoemitters, with each said photoemitter positioned to illuminate a respective column of said mask matrix.

4. The system of claim 3 wherein said photodetection means comprises M+1 photodetectors, each positioned to receive light transmitted from a respective row of said mask matrix.

5. The system of claim 1 wherein each of said first signals represents an $M\times1$ column vector which results from the matrix operation defined by:

$$Q=M+c$$

where M+c is a matrix whose elements correspond in value to said elements of said M rows of said mask matrix, and said second signal represents a scalar quantity which results from the matrix operation defined by:

$$QC_{constant}$$

where $C_{constant}$ is a row vector represented by said remaining row of said mask matrix and the elements of said remaining row are all c.

6. The system of claim 5 wherein said photodetection means comprises M+1 photodetectors with photodetectors 1 through M providing said column vector signal and photodetector M+1 providing said scalar quantity signal.

7. The system of claim 1 wherein said M rows comprise the first M rows of said mask matrix and said remaining row comprises the last row of said mask matrix.

8. The system of claim 1 wherein said M rows comprise the top M rows of said mask matrix and said remaining row comprises the bottom row of said mask matrix.

* * * * *